(12) United States Patent
Sekino et al.

(10) Patent No.: US 10,815,595 B2
(45) Date of Patent: Oct. 27, 2020

(54) MANUFACTURING METHOD, MANUFACTURING APPARATUS AND MANUFACTURING JIG OF TRIM COVER SURFACE MATERIAL

(71) Applicant: TACHI-S CO., LTD., Tokyo (JP)

(72) Inventors: Hiroshi Sekino, Tokyo (JP); Yukihito Kobayashi, Tokyo (JP); Norio Endou, Tokyo (JP); Takahiro Kikuchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 659 days.

(21) Appl. No.: 15/493,953

(22) Filed: Apr. 21, 2017

(65) Prior Publication Data

US 2017/0306543 A1   Oct. 26, 2017

(30) Foreign Application Priority Data

Apr. 26, 2016   (JP) .................. 2016-088331

(51) Int. Cl.
*D05B 39/00* (2006.01)
*B60N 2/58* (2006.01)
*D05C 7/04* (2006.01)

(52) U.S. Cl.
CPC ........... *D05B 39/00* (2013.01); *B60N 2/5891* (2013.01); *D05C 7/04* (2013.01)

(58) Field of Classification Search
CPC ............. D05C 7/04; D05C 9/04; D05B 39/00
USPC ....................................... 112/103
See application file for complete search history.

(56) References Cited

U.S. PATENT DOCUMENTS

| 3,127,858 | A | * | 4/1964 | Cash | .................. B68G 7/08 112/118 |
| 3,180,293 | A | * | 4/1965 | Cash | .................. B68G 7/08 112/118 |
| 5,003,897 | A | | 4/1991 | Yokoe et al. | |
| 5,586,400 | A | * | 12/1996 | Moore, III | ............... D05C 9/04 112/103 |
| 2010/0236461 | A1 | * | 9/2010 | Kawaguchi | ............ D05B 19/12 112/102.5 |
| 2011/0056420 | A1 | * | 3/2011 | Kawaguchi | .............. D05C 9/04 112/103 |
| 2012/0222595 | A1 | * | 9/2012 | Nakama | ................... D05C 7/04 112/2 |

(Continued)

FOREIGN PATENT DOCUMENTS

| JP | 7-38907 B2 | 5/1995 |
| JP | 2013-162957 A | 8/2013 |

*Primary Examiner* — Nathan E Durham
(74) *Attorney, Agent, or Firm* — Seed IP Law Group LLP

(57) ABSTRACT

A manufacturing method of a trim cover surface material, includes: providing a jig including a first frame configured to hold an outer periphery of an outer material and a second frame configured to hold an outer periphery of a wadding material by overlapping the wadding material on the outer material which is held by the first frame; holding the outer periphery of the outer material with the first frame of the jig; forming through holes at the outer material which is held by the jig; holding the outer periphery of the wadding material with the second frame of the jig while the outer material is held by the first frame of the jig; and forming stitches at the outer material and the wadding material which are overlapped and held by the jig.

13 Claims, 7 Drawing Sheets

(56) References Cited

U.S. PATENT DOCUMENTS

2014/0339843 A1\* 11/2014 Wenzel .................. D05B 15/00
296/1.08

\* cited by examiner

MANUFACTURING METHOD, MANUFACTURING APPARATUS AND MANUFACTURING JIG OF TRIM COVER SURFACE MATERIAL

CROSS-REFERENCE TO RELATED APPLICATION(S)

This application is based upon and claims the benefit of priority from Japanese Patent Application No. 2016-088331, filed on Apr. 26, 2016, the entire contents of which are incorporated herein by reference.

BACKGROUND

1. Field of the Invention

The present invention relates to a manufacturing method, a manufacturing apparatus and a manufacturing jig of a trim cover surface material.

2. Description of the Related Art

A vehicle seat typically includes a cushioning pad and a trim cover that covers the cushioning pad, and the trim cover is made by sewing a plurality of surface materials. Leather (natural leather, synthetic leather) is used as an example of the surface material, and, from a view of improving breathability and design, a large number of through holes may be formed at the leather by a predetermined pattern. Furthermore, from a view of improving design of the seat, stitches may be formed at the surface material, and the stitches avoid the through holes of the surface material and are formed at the gap part between through hole patterns (for example, refers to JP-A-2013-162957).

The trim cover surface material described in JP-A-2013-162957 is formed by laminating a wadding material made of foaming resin such as slab urethane on an outer material of leather which is formed with a plurality of through holes, and the leather and the wadding material are bonded. To secure the breathability of the leather, the leather is bonded with the wadding material at the outer periphery except where the through holes are formed. The stitches are formed at the gap part between the through hole patterns of the surface material.

The stitches of the surface material are typically formed by using a sewing machine driven according to a program. In automatic sewing using this kind of sewing machine, the sewed object such as the surface material is installed on the sewing machine while, for example, the outer periphery is held by a frame-like jig, and slack is removed (for example, refers to JP-B-H07-38907).

The surface material described in JP-A-2013-162957 is formed by laminating the wadding material on the leather which is formed with through holes beforehand, but, for example, when the leather which are formed with the through holes beforehand are procured from outside, a relatively long time elapses from when the leather is formed with the through holes until the stitches are formed at the surface material.

If the elapsed time after the leather is formed with the through holes becomes long, the leather deforms under the influence of temperature and humidity, and due to the deformation of the leather, the through hole patterns may be deviated. When the through hole patterns are deviated, misalignment of the stitches which the surface material is formed with by automatic sewing and the through hole patterns may occur, and design may be spoiled.

For the surface material described in JP-A-2013-162957, the leather is bonded with the wadding material at the outer periphery except where the through holes are formed, but when the stitches are formed by automatic sewing, the outer periphery of the surface material is held by a jig. Therefore, the leather and the wadding material are bonded, and then the surface material whose leather and wadding material are bonded is set on the jig, but an error in the positioning of the surface material to the jig may occur, and when the leather is deformed, the positioning of the surface material becomes further harder. When the error occurs in the positioning of the surface material, misalignment of the stitches and the through holes may occur and design may be spoiled.

SUMMARY

The present invention is made in view of the above circumstances, and the object of the present invention is to provide a manufacturing method and a manufacturing apparatus of a trim cover surface material and a manufacturing jig which can inhibit the misalignment of stitches and through hole patterns.

According to an aspect of the present invention, there is provided a manufacturing method of a trim cover surface material, the trim cover surface material including: an outer material which is formed with a plurality of through holes by a predetermined pattern; and a wadding material laminated on the outer material, the trim cover surface material being formed with stitches that sew together the outer material and the wadding material at gap portions between through hole patterns, the manufacturing method including: providing a jig including: a first frame configured to hold an outer periphery of the outer material; and a second frame configured to hold an outer periphery of the wadding material by overlapping the wadding material on the outer material which is held by the first frame; holding the outer periphery of the outer material with the first frame of the jig; forming the through holes at the outer material which is held by the jig; holding the outer periphery of the wadding material with the second frame of the jig while the outer material is held by the first frame of the jig; and forming the stitches at the outer material and the wadding material which are overlapped and held by the jig.

According to another aspect of the present invention, there is provided a manufacturing apparatus of a trim cover surface material, the trim cover surface material including: an outer material which is formed with a plurality of through holes by a predetermined pattern; and a wadding material laminated on the outer material, the trim cover surface material being formed with stitches that sew together the outer material and the wadding material at gap portions between through hole patterns, the manufacturing apparatus including: a drilling machine and a sewing machine which are installed sequentially on a production line; and a jig which holds the outer material and the wadding material, wherein: the jig includes: a first frame configured to hold an outer periphery of the outer material; and a second frame configured to hold an outer periphery of the wadding material by overlapping the wadding material on the outer material which is held by the first frame; the drilling machine includes an installing part on which the jig is installed; the drilling machine forms the through holes at the outer material which is held by the jig which is installed on the installing part; the sewing machine includes an installing part on which the jig is installed; and the sewing machine forms the stitches at the outer material and the wadding material which are held by the jig which is installed on the installing part.

According to still another aspect of the present invention, there is provided a manufacturing jig of a trim cover surface material, the trim cover surface material including: an outer material which is formed with a plurality of through holes by a predetermined pattern; and a wadding material laminated on the outer material, the trim cover surface material being formed with stitches that sew together the outer material and the wadding material at gap portions between through hole patterns, the manufacturing jig including: a first frame configured to hold an outer periphery of the outer material; and a second frame configured to hold an outer periphery of the wadding material by overlapping the wadding material on the outer material which is held by the first frame.

According to the present invention, the misalignment of stitches and through hole patterns can be inhibited.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
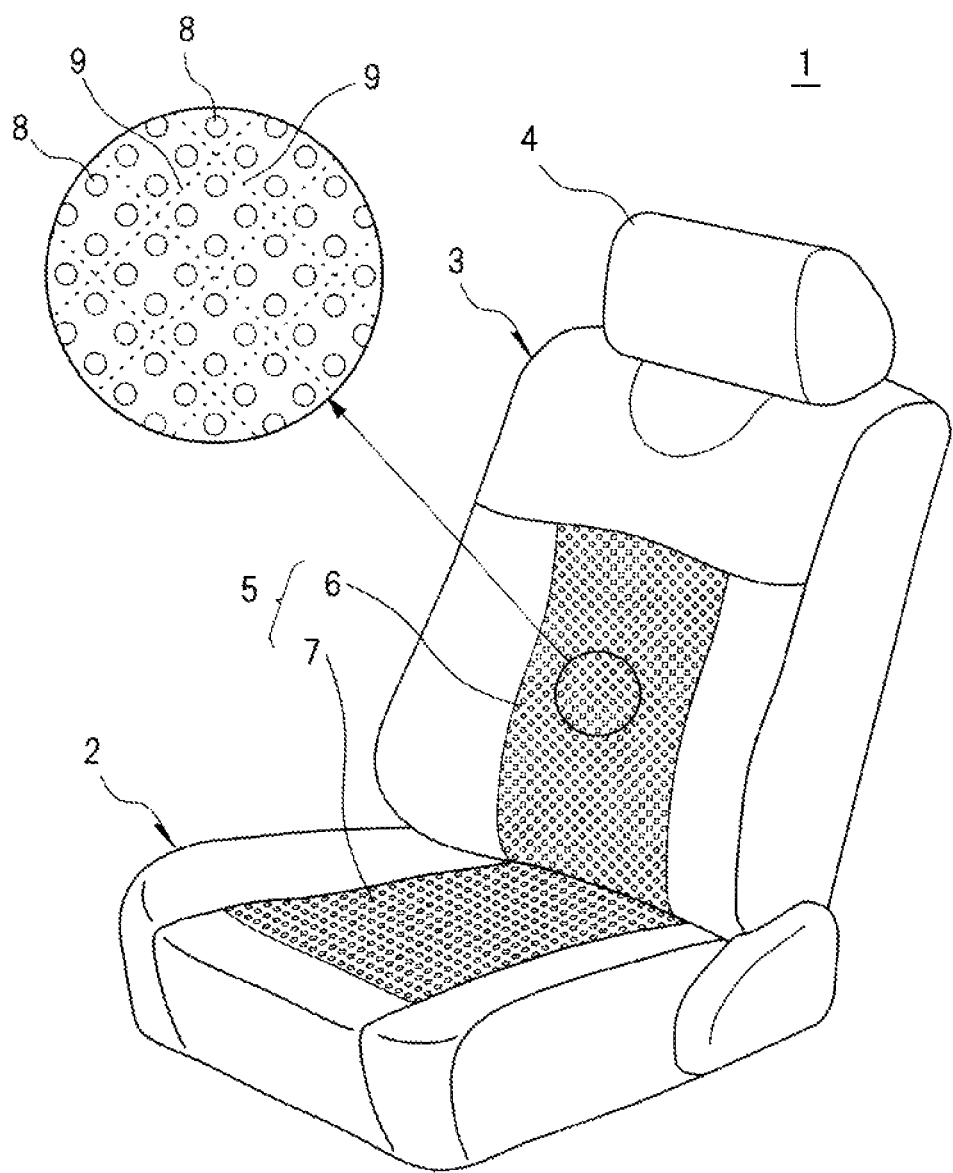
FIG. 1 is a perspective view of a vehicle seat to describe an embodiment of the present invention.

FIG. 1 shows an example of the vehicle seat to describe an embodiment of the present invention.

A vehicle seat 1 shown in FIG. 1 includes a seat cushion 2 which forms a bearing surface portion, a seat pack 3 which forms a back rest portion, and a head rest 4 which supports the head of a passenger who is seated on the seat. Each of the seat cushion 2, the seat pack 3 and the head rest 4 has a cushioning pad made of foam material such as urethane foam, and a frame which supports the cushioning pad.

The cushioning pad of the seat cushion 2 and the cushioning pad of the seat pack 3 are covered integrally with a trim cover 5, and the cushioning pad of the head rest 4 is also covered with the trim cover 5 or another trim cover.

The cushioning pad of the seat cushion 2 and the cushioning pad of the seat pack 3 may be covered by individual trim covers, respectively, and when the head rest 4 is a fixed head rest and is formed integrally with the seat pack 3, the cushioning pad of the head rest 4 may be covered integrally with the cushioning pad of the seat pack 3 by one trim cover, or may be covered integrally with the cushioning pad of the seat cushion 2 and the cushioning pad of the seat pack 3 by one trim cover.

The trim cover 5 is formed by sewing and joining a plurality of surface materials, and among the plurality of surface materials that form the trim cover 5, for example, a surface material 6 which covers the central portion in the widthwise direction of the front surface of the seat pack 3, and a surface material 7 which covers the central portion in the widthwise direction of the bearing surface of the seat cushion 2, have a plurality of through holes 8 that are formed by a predetermined pattern and stitches 9 which are formed at the gap portion between the through hole patterns. In the shown example, a large number of through holes 8 are formed by a pattern in which a quadrangle is formed by one group of through holes 8 which includes four through holes, and stitches 9 are formed into a mesh shape to sew the gap between adjacent quadrangles.

The pattern of the through holes 8 and the stitches 9 is not limited to the shown example, and the through holes 8 and the stitches 9 may be provided at a surface material that covers other sites of the seat cushion 2 and the seat pack 3.

Figure 2:
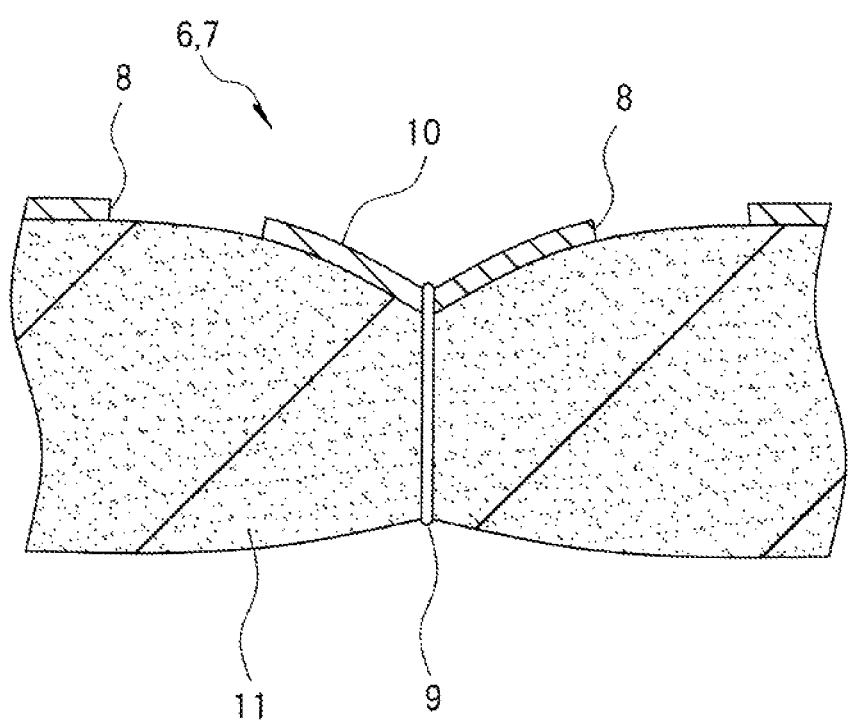
FIG. 2 is a sectional view of a surface material of FIG. 1.

FIG. 2 shows the constitution of the surface material 6.

The surface material 6 is formed of an outer material 10 and a wadding material 11 which is laminated on the outer material 10. The through holes 8 are formed only at the outer material 10. The stitches 9 are formed across the outer material 10 and the wadding material 11, and the outer material 10 and the wadding material 11 are sewed together by the stitches 9.

It is preferable that the outer material 10 is a material which will not break even if the through holes 8 are formed, and, for example, leather (natural leather, synthetic leather) or a nonwoven fabric is preferred. The wadding material 11 has cushion property, and, for example, resin foam such as soft urethane foam is preferred.

For the purpose of, such as, reinforcing the surface material 6, a back material may be further laminated on the wadding material 11, and in this case, the outer material 10, the wadding material 11 and the back material are sewed together by the stitches 9. An appropriate material such as cloth (textile, knitting, and nonwoven fabric) or resin film is used for the back material depending on the purpose.

The surface material 7 is constructed like the surface material 6.

Figure 3:
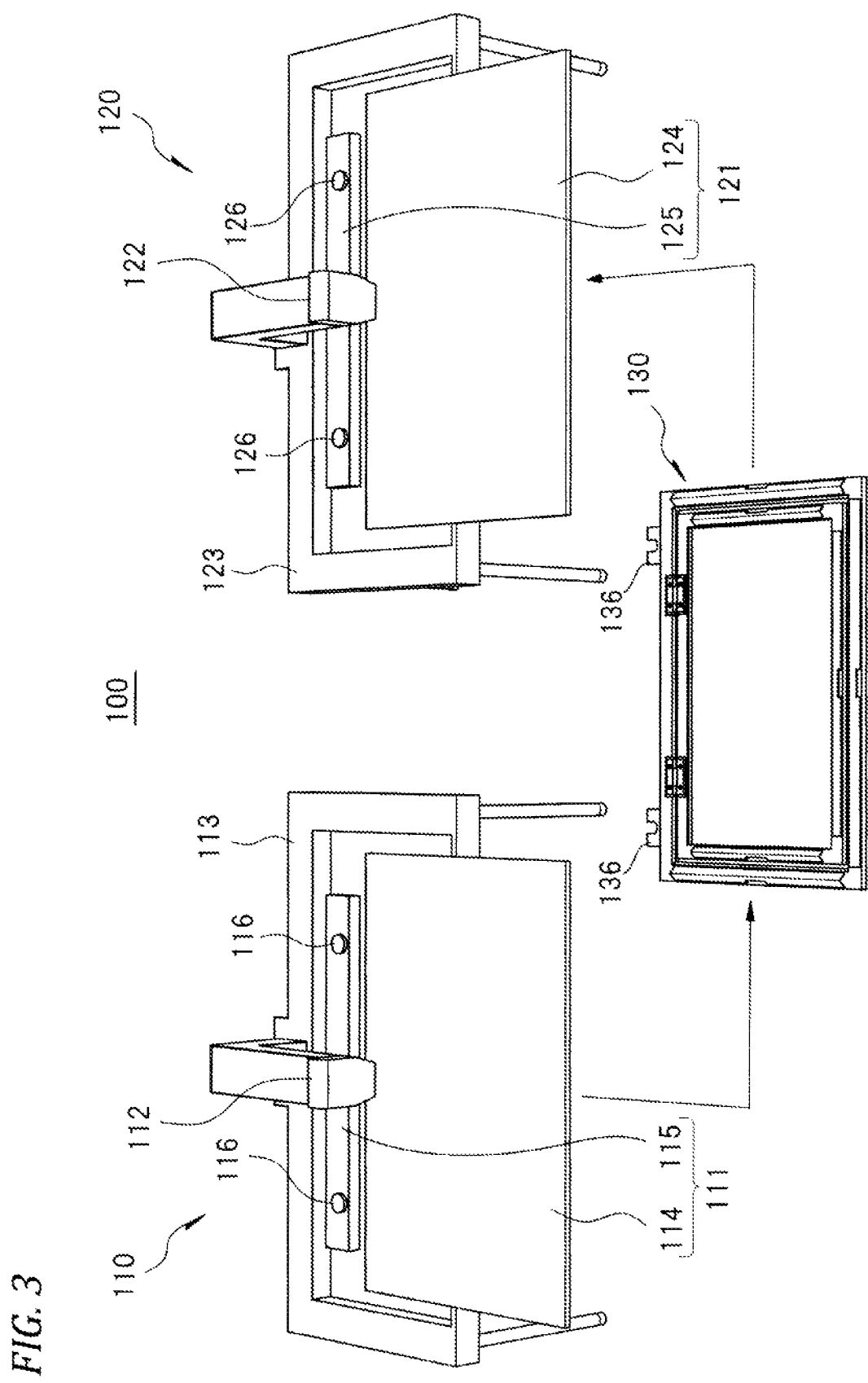
FIG. 3 is a schematic diagram of a manufacturing apparatus of the surface material of FIG. 1.

FIG. 3 shows the constitution of a manufacturing apparatus of the surface materials 6, 7.

The manufacturing apparatus 100 of the surface materials 6, 7 includes a drilling apparatus 110 and a sewing machine 120, which are installed sequentially on a production line, and a jig 130. The jig 130 is so constructed that the outer material 10 and the wadding material 11 can be held, and is moved from the drilling apparatus 110 to the sewing machine 120. The movement of the jig 130 may be performed, for example, by a worker and may be performed by a conveyance machine.

The drilling machine 110 has an installing part 111 where the jig 130 is installed, a head 112 to which a punch for forming through holes is mounted, and a base 113 which supports the installing part 111 and the head 112. The installing part 111 has a flat table 114 on which the jig 130 is placed and a slider 115 which moves the jig 130 on the table 114 in the X direction and the Y direction. The slider 115 is driven according to a program corresponding to the pattern of the through holes 8 formed at the outer material 10.

The sewing machine 120 has a flat installing part 121 on which the jig 130 is placed, a head 122 to which a sewing needle for forming stitches is mounted, and a base 123 which supports the installing part 121 and the head 122. The installing part 121 has a flat table 124 on which the jig 130 is placed, and a slider 125 which moves the jig 130 on the table in the X direction and the Y direction. The slider 125 is driven according to a program corresponding to the pattern of the stitches 9 formed across the outer material 10 and the wadding material 11.

The jig 130, the slider 115 of the drilling machine 110 and the slider 125 of the sewing machine 120 are provided respectively with engaging parts to position the jig 130 relative the head 112 on the table 114 of the drilling machine 110, and to position the jig 130 relative to the head 122 on the table 124 of the sewing machine 120.

In the shown example, the jig 130 is formed into a roughly rectangular frame shape, and the slider 115 and the slider 125 are respectively formed into a bar-like shape along the outer periphery of one side of the four sides of the jig 130. The engaging part of the jig 130 is formed of a pair of chucks 136 which are arranged to be spaced at the outer periphery of one side, and which are formed with roughly U-like engaging slots, respectively. The engaging part of the slider 115 is formed of a pair of engaging pins 116 which are fitted and held in the engaging slots of the pair of chucks 136. The engaging part of the slider 125 is formed of a pair of engaging pins 126 which are fitted and held in the engaging slots of the pair of chucks 136.

While the jig 130 and the outer material 10 held on the jig 130 are positioned relative to the head 112 on the table 114 of the drilling machine 110, when the slider 115 is driven, the head 112 is moved relative to the jig 130, and the through holes 8 are formed at the outer material 10 by a predetermined pattern.

While the jig 130 and the outer material 10 and the wadding material 11 which are held by the jig 130 are positioned relative to the head 122 on the table 124 of the sewing machine 120, when the slider 125 is driven, the head 122 is moved relative to the jig 130, and the stitches 9 are formed at the outer material 10 and the wadding material 11 by a predetermined pattern.

Figure 4:
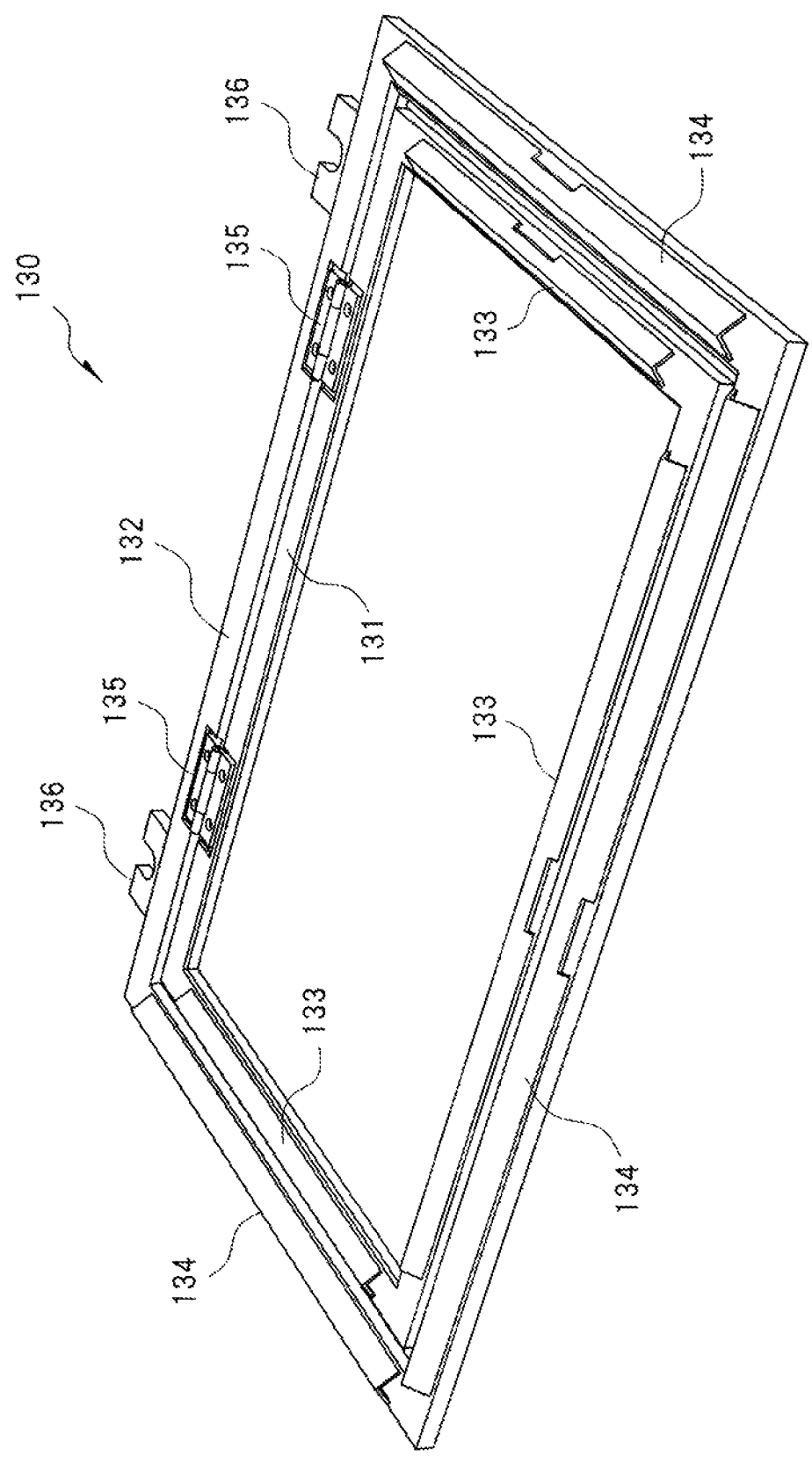
FIG. 4 is a perspective view of a manufacturing jig of the surface material of FIG. 1.
Figure 5:
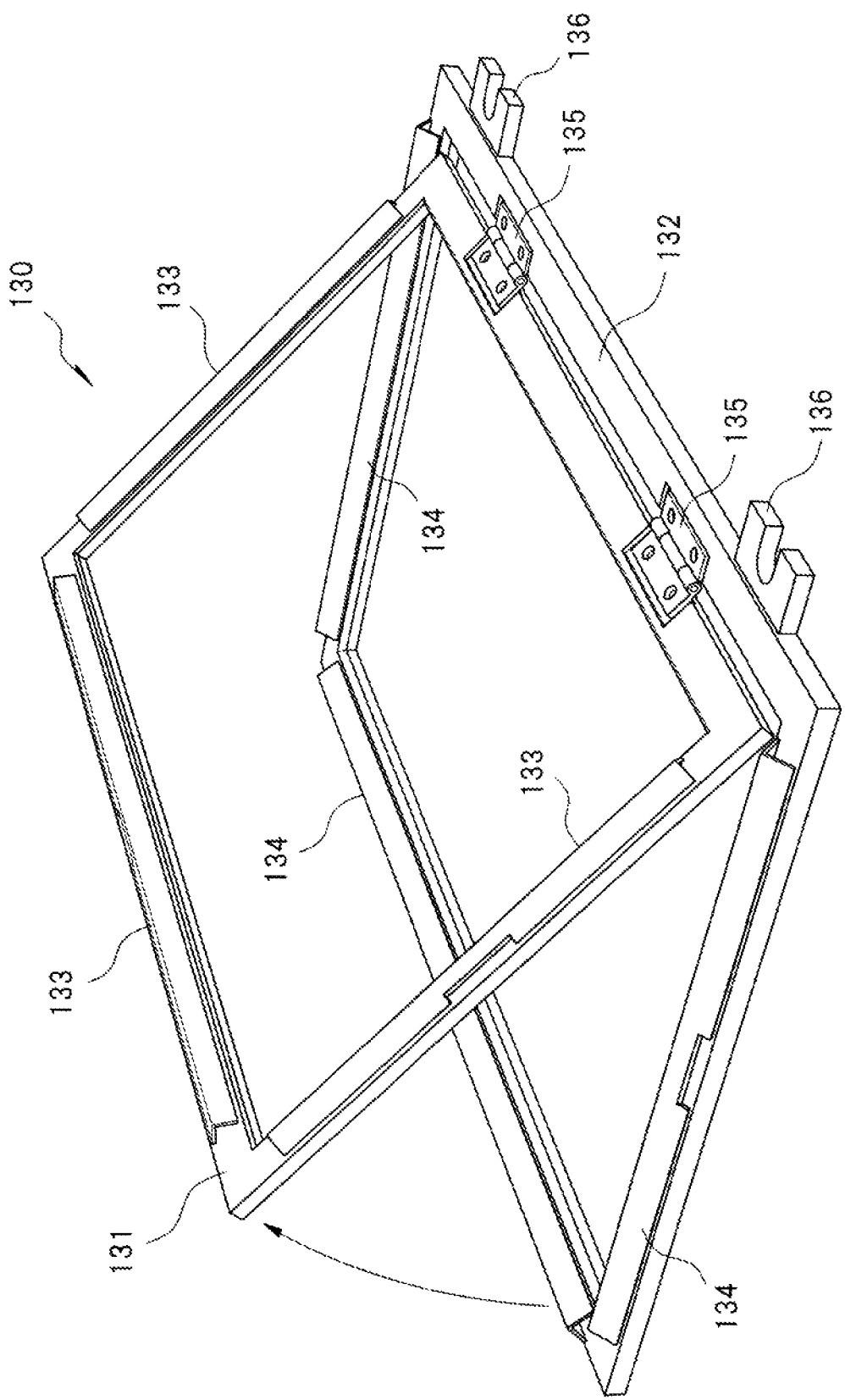
FIG. 5 is a perspective view which shows that the manufacturing jig of FIG. 4 is opened.

FIGS. 4 and 5 show the detailed constitution of the jig 130.

The jig 130 has a roughly rectangular first frame 131 which holds the outer material 10 and a roughly rectangular second frame 132 which holds the wadding material 11. The first frame 131 is placed inside the second frame 132, and the first frame 131 and the second frame 132 are connected to be openable and closeable through a pair of hinges 135.

The four sides of the first frame 131 are provided with clamps 133 which can be opened and closed, respectively, and the first frame 131 holds the outer material 10 by clamping the outer periphery of the outer material 10 between the frame of the first frame 131 and the clamps 133 of the four sides.

Similarly, the four sides of the second frame 132 are provided with clamps 134 which can be opened and closed, respectively, and the second frame 132 holds the wadding material 11 by clamping the outer periphery of the wadding material 11 between the frame of the second frame 132 and the clamps 134 of the four sides.

According to the above-mentioned constitution, by rotating the first frame 131 which holds the outer material 10 relative to the second frame 132 to open the first frame 131 and the second frame 132, without removing the outer material 10 from the first frame 131, the wadding material 11 can be held by the second frame 132. Then by closing the first frame 131 and the second frame 132 again, the outer material 10 and the wadding material 11 can be overlapped.

FIGS. 6A to 6E show manufacturing processes of the surface materials 6, 7 using the manufacturing apparatus 100.

Figure 6A:
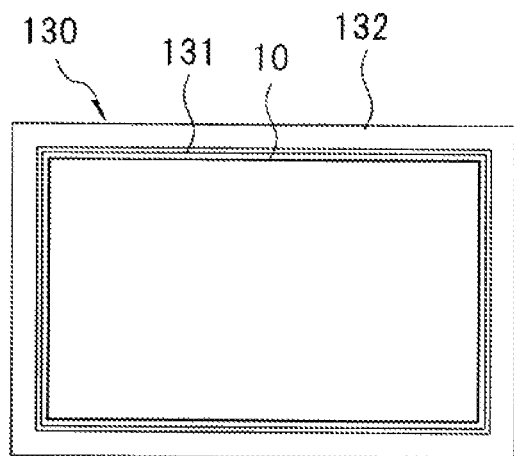
FIG. 6A is a schematic diagram to describe a manufacturing process of the surface material of FIG. 1.
Figure 6B:
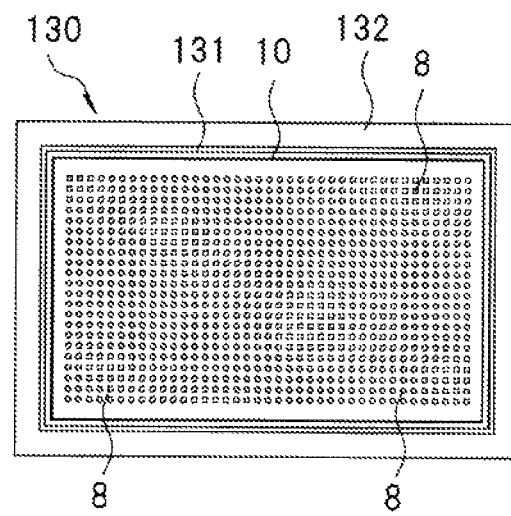
FIG. 6B is a schematic diagram to describe a manufacturing process of the surface material of FIG. 1.

At first, as shown in FIG. 6A, only the outer material 10 is held by the first frame 131 of the jig 130. Then, as shown in FIG. 6B, the jig 130 which holds only the outer material 10 with the first frame 131 is installed on the drilling machine 110 of the manufacturing apparatus 100 shown in FIG. 3, and the outer material 10 is formed with a lot of through holes 8 by a predetermined pattern.

Figure 6C:
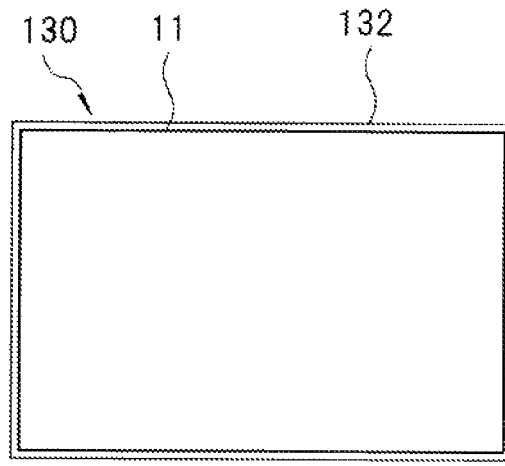
FIG. 6C is a schematic diagram to describe a manufacturing process of the surface material of FIG. 1.
Figure 6D:
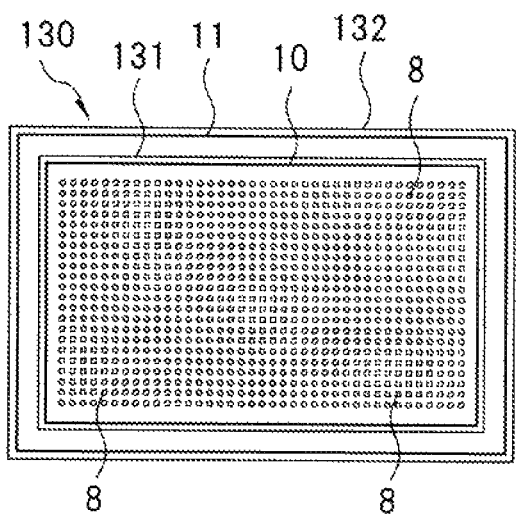
FIG. 6D is a schematic diagram to describe a manufacturing process of the surface material of FIG. 1.

Then, as shown in FIG. 6C, the first frame 131 which holds the outer material 10 is rotated relative to the second frame 132 to open the first frame 131 and the second frame 132, and the wadding material 11 is held by the second frame 132. Then, as shown in FIG. 6D, the first frame 131 which holds the surface material 10 and the second frame 132 which holds the wadding material 11 are closed again, and, the outer material 10 and wadding material 11 are overlapped.

Figure 6E:
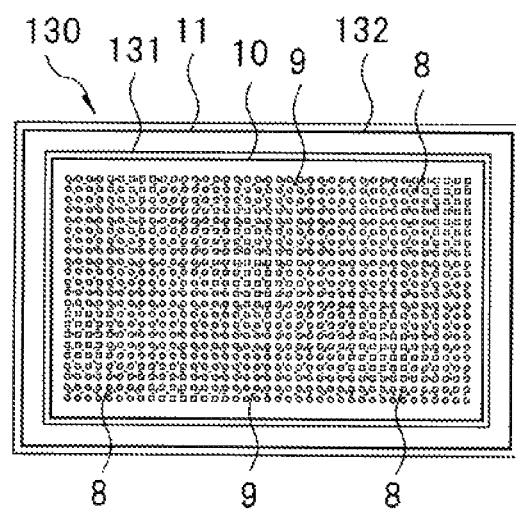
FIG. 6E is a schematic diagram to describe a manufacturing process of the surface material of FIG. 1.

Then, as shown in FIG. 6E, the jig 130 which holds the outer material 10 and the wadding material 11 is installed on the sewing machine 120 of the manufacturing apparatus 100 shown in FIG. 3, and the outer material 10 and the wadding material 11 are formed with the stitches 9, which sew the outer material 10 and the wadding material 11 together, at the gap portion between the through hole patterns.

According to the above method of manufacturing the surface materials 6, 7, after the through holes 8 are formed at the outer material 10 which is held by the jig 130, the wadding material 11 is held by the jig 130 without removing the outer material 10 from the jig 130, and then the stitches 9 are formed at the outer material 10 and the wadding material 11 held by the jig 130. Because continuously from the formation of the through holes 8 until the formation of the stitches 9, the jig 130 keeps holding the outer material 10, positioning error of the outer material 10 can be reduced, and misalignment of the stitches 9 and the through hole patterns can be inhibited.

What is claimed is:

1. A manufacturing method of a trim cover surface material, the trim cover surface material including: an outer material which is formed with a plurality of through holes by a predetermined pattern; and a wadding material laminated on the outer material, the trim cover surface material being formed with stitches that sew together the outer material and the wadding material at gap portions between through hole patterns, the manufacturing method comprising:

providing a jig including: a first frame configured to hold an outer periphery of the outer material; and a second frame configured to hold an outer periphery of the wadding material by overlapping the wadding material on the outer material which is held by the first frame;

holding the outer periphery of the outer material with the first frame of the jig;

forming the plurality of through holes in the outer material which is held by the jig;

holding the outer periphery of the wadding material with the second frame of the jig while the outer material is held by the first frame of the jig; and forming the stitches in the outer material and the wadding material that are overlapping and held by the jig.

2. The manufacturing method of the trim cover surface material according to claim 1, further comprising:

positioning the outer material and the jig holding the outer material relative to a drilling machine that forms the plurality of through holes in the outer material; and positioning the outer material, the wadding material and the jig holding the outer material and the wadding material relative to a sewing machine that forms the stitches in the outer material and the wadding material.

3. The manufacturing method of the trim cover surface material according to claim 2, further comprising:
coupling the jig to the drilling machine when the jig is holding the outer periphery of the outer material;
decoupling the jig from the drilling machine when the jig is holding the outer periphery of the outer material after forming the plurality of through holes in the outer material; and
coupling the jig to the sewing machine when the jig is holding the outer periphery of the outer material and the outer periphery of the wadding material.

4. The manufacturing method of the trim cover surface material according to claim 1, wherein holding the outer periphery of the outer material with the first frame of the jig further comprises holding the outer periphery of the outer material with a plurality of clamps of the first frame.

5. The manufacturing method of the trim cover surface material according to claim 1, wherein holding the outer periphery of the wadding material with the second frame of the jig further comprises holding the outer periphery of the wadding material with a plurality of clamps of the second frame.

6. A manufacturing method of a trim cover surface material, comprising:
forming a plurality of through holes in an outer material of a trim cover surface material while holding an outer periphery of the outer material with a jig; and
forming a plurality of stitches in the outer material thereby coupling the outer material to a wadding material of the trim cover surface material while holding an outer periphery of the wadding material with the jig and while holding the outer periphery of the outer material with the jig,
wherein holding the outer periphery of the outer material with the jig further comprises holding the outer periphery of the outer material with a first frame of the jig; and
wherein holding the outer periphery of the wadding material with the jig while holding the outer periphery of the outer material with the jig further comprises holding the outer periphery of the wadding material with a second frame of the jig surrounding the first frame of the jig.

7. The manufacturing method of the trim cover surface material according to claim 6, wherein forming the plurality of through holes further comprises mounting the jig on a drilling machine.

8. The manufacturing method of the trim cover surface material according to claim 7, wherein mounting the jig on the drilling machine further comprises coupling an engaging part of the jig to an engaging part of the drilling machine when the jig holds the outer periphery of the outer material.

9. The manufacturing method of the trim cover surface material according to claim 6, wherein forming the plurality of stitches further comprises mounting the jig on a sewing machine.

10. The manufacturing method of the trim cover surface material according to claim 9, wherein mounting the jig on the sewing machine further comprises coupling an engaging part of the jig to an engaging part of the sewing machine when the jig holds the outer periphery of the outer material and the outer periphery of the wadding material.

11. The manufacturing method of the trim cover surface material according to claim 6, wherein forming the plurality of stitches further comprises forming the plurality of stitches between the plurality of through holes in the outer material coupling the outer material to the wadding material.

12. The manufacturing method of the trim cover surface material according to claim 6, wherein holding the outer periphery of the outer material with the first frame includes holding the outer periphery of the outer material with a first clamp of the first frame; and
wherein holding the outer periphery of the wadding material with the second frame includes holding the outer periphery of the wadding material with a second clamp of the second frame.

13. The manufacturing method of the trim cover surface material according to claim 6, further comprising:
positioning the outer material and the jig holding the outer material relative to a drilling machine that forms the through holes in the outer material; and
positioning the outer material, the wadding material and the jig holding the outer material and the wadding material relative to a sewing machine that forms the stitches in the outer material and the wadding material.

* * * * *